United States Patent Office 3,551,211
Patented Dec. 29, 1970

3,551,211
ANHYDROUS BATTERY UTILIZING POLYMERIC ELECTROLYTE
Carl A. Grulke, Berea, Ohio, assignor to Union Carbide Corporation, New York, N.Y., a corporation of New York
No Drawing. Filed Dec. 23, 1968, Ser. No. 786,411
Int. Cl. H01m 11/00
U.S. Cl. 136—153     14 Claims

ABSTRACT OF THE DISCLOSURE

An electrolyte suitable for battery use comprising an ionically conductive material having a polymeric chain with radicals regularly disposed along the chain. Each radical contains at least one atom capable of forming a hydrogen bond and at least one hydrogen atom capable of entering into a hydrogen bond. The radicals are of such length and geometrical configuration as to permit each radical to form at least one hydrogen bond with an adjacent radical.

---

This invention relates to battery electrolytes and more particularly to ionically conductive polymeric compositions wherein the polymeric materials per se serve as the ionically conductive media.

The ionically conductive polymers of this invention are conductive by virtue of organic radicals positioned along a polymeric "backbone" and require no added polar solvent or inorganic electrolyte in order to usefully conduct an electrical current. However, in some instances, the conductive properties of the organic materials can be desirably improved as will become apparent hereinafter.

The synthetic materials used herein are to be differentiated from previously proposed materials applicable to making batteries. It has been proposed, for example, to make "dry" cells using certain solid infusible and insoluble swellable resins of the sort known as ion exchange resins to provide internal ionic contact between anode and cathode. Such resins are normally used in conjunction with polar swelling agents, usually water, to provide a conductive path between the battery elements. It has also been proposed to use resins swollen with a polar liquid containing dissolved inorganic salts as the conductive medium. These proposals have been subject to various difficulties and have not provided substantially anhydrous cells (a condition desirable for high temperature storage) or have not been amenable to simple construction techniques. Moreover, such resins have been suitable for battery use as electrolytes only in the simplest of voltaic cells of extremely low current capacity, i.e., in the microampere range.

In contrast, the synthetic ionically conductive materials of the present application, by their versatility of fabrication and use, are adaptable to a wide variety of devices used to conduct an electrical current for one purpose or another. For instance, these ionically conductive materials are applicable to the fabrication of dry batteries and are particularly well adapted to the construction of substantially anhydrous batteries wherein, if desired, the unit cells can be made with a very small anode-to-cathode dimension, i.e., very thin. Such unit cells are applicable to building a "pile" type of battery with long shelf life and capable of producing voltages greater than 100 volts per inch of battery dimension along the direction of stacking of the unit cells. Such cells have achieved currents in the ampere range, a totally unexpected result when viewed in light of the microampere currents of the ion exchange resins of the prior art.

Another advantage of the materials provided by the present invention is that generally they are soluble in polar solvents such as water and can be used to form conductive films or used to print conductive layers on solid surfaces, and subsequently the solvent can be removed by drying to regain the desirable properties of the dried material.

These and other desirable properties are achieved by use, as a battery electrolyte, of an ionically conductive polymer having regularly disposed groups attached to the polymer chain, which groups each contain at least one resonance group capable of forming a hydrogen bond with a hydrogen atom and at least one hydrogen atom capable of entering into a hydrogen bond. The groups are selected in a manner such that they are of sufficient length and geometrical configuration with relation to their disposition on the polymeric chain as to permit each group to form at least one hydrogen bond with an adjacent group.

Preferred ionic conductors are synthetic materials which display a discrete prolongate structure showing no evidence of cross-linking or gel structure. They can be formed from various starting materials and their chemical compositions will vary accordingly.

In general, these conductors comprise two basic starting materials. The first is a polymer with regularly occurring reactive groups attached to the basic polymeric chain or "backbone." The second is a compound suitable for producing an ionically conductive sheath on the outer surface of the backbone structure.

The polymeric chain or "backbone" can be any prolongate chemical structure to which regularly disposed radicals can be attached. The backbone may contain, for example, carbon, oxygen, sulfur, phosphorus, or mixtures thereof. However, the preferred backbone is an all carbon structure and most preferred is a structure containing the recurring group

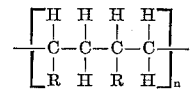

wherein R is a reactive group capable of chemically reacting with or functionally hydrogen bonding a radical structure suitable for producing an ionically conductive sheath on the backbone structure.

Compounds suitable for producing an ionically conductive sheath are those which contain resonance groups which are capable of entering into hydrogen bonds. The term "resonance groups" as used herein refers to the presence of an electron donor group in the compound. Such electron donor groups are usually associated with a double bond other than a carbon-carbon double bond, for example C=O or C=S.

An example of a preferred structure illustrating chemically reacted radical structures is the reaction product of urea and polyacrylic acid having the structure

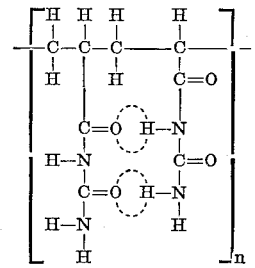

In this structure the backbone is formed by the polyacrylic acid chain. The reactive groups (originally COOH) chemically bond the urea structure to the backbone at regularly occurring intervals. The infrared absorption spectrum of this prolongate ionic conductor is indicative of some interaction between the pendant groups on the polymeric backbone as indicated by dotted lines in the above structure between the oxygen atom of one group and a hydrogen atom in the adjacent group.

Although it is not certain, and applicant does not desire to be limited by any theory of reaction, the interaction between the hydrogen atom and the highly electronegative oxygen atom which takes place in this structure is, in all respects, the interaction known as hydrogen bonding. The chemical structures which lend themselves to the formation of hydrogen bonds are the same structures which appear to give rise, at least in part, to the conductive properties of the polymeric materials.

Hydrogen bonds are not ordinary chemical bonds but are bonds which, according to current belief, arise through the electrostatic attraction between a highly electronegative atom such as oxygen, nitrogen, sulphur, fluorine, or chlorine and a chemically bound hydrogen atom. In the usual instance, the hydrogen atoms entering into the hydrogen bond are those chemically bound to oxygen or nitrogen. The body of knowledge concerning the properties and configuration of compounds which lead to the formation of hydrogen bonds forms a valuable guide to selecting the materials and reactive groups to be used in making the conductive polymers.

An example of a preferred structure illustrating a functionally hydrogen bonded radical structure is the reaction product of polyacrylamide and urea having the structure

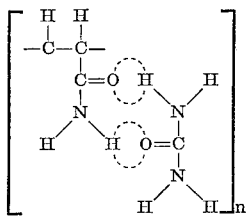

In this structure the urea is not bound to the reactive group through chemical reaction but rather has formed two hydrogen bonds which hold the urea to the backbone structure.

As has previously been stated, the backbone material must be one which has regularly occuring reactive groups attached to the basic polymeric chain. Illustrative of preferred materials, in addition to polyacrylic acid and polyacrylamide, are polyvinyl alcohol, polyvinyl pyridine, carboxy methyl cellulose, hydroxy ethyl cellulose, and the hexametaphosphates or other polyphosphates. The organic materials are most preferred.

The nature of the compounds to be reacted with the polymeric starting materials will depend in part upon the type of reactive groups on the polymer, in part on the distance between the reactive groups, and in part on the length of the radical to which the functional group is affixed. These factors are all to be considered in selecting the reactants which will give rise to the desired prolongate conductive structure.

It is to be understood that the terms "reacted" and "bonded" are used herein in their broadest sense and apply to both true chemical reaction and hydrogen bonding.

Preferred compounds to be reacted with the polymeric backbone include monoamino, diamino or triamino compounds having at least one primary amino group. This class of compounds includes alkylene diamines such as ethylene diamine and butylene diamine, diethylene triamine, urea, guanidine, hydrazine, formamide, oxamide, malonamide, fumaramide, cyanoacetamide and maleamide.

It has been found that compounds combining electron donor groups $C=O$ and $NH_2$ are particularly useful. Compounds having other electron donor groups are also useful in the practice of the present invention. An example of such a compound is thiourea.

As has previously been mentioned, the conductivity of the polymers can be enhanced by the addition of certain materials. It was found, for example, that with many of the polymers described above ionically conductive structures can be produced by using a compound, such as water, which simply forms hydrogen bonds between the reactive groups attached to the polymer backbone. Applicant has found, however, that compounds can be reacted chemically with the regularly occurring reactive groups on the polymeric backbone to furnish both an atom capable of entering into a hydrogen bond with a hydrogen atom (e.g. oxygen) and also a hydrogen atom capable of entering into a hydrogen bond, such as the hydrogen atom attached to a nitrogen atoms.

To illustrate the use of water alone, it has been found that polyacrylic acid, when equilibrated with water vapor, shows improved conductivity with increased water content as a result of hydrogen bonding between the water molecules and the carboxylic groups on the polymer chain. Anhydrous polyacrylic acid has a specific conductivity of about $2 \times 10^{-9}$ mho. per centimeter; whereas, polyacrylic acid, which has been slowly equilibrated with water vapor, has a greatly increased specific conductivity. After the first mole of water has been added per mole of carboxylic groups on the acid, the specific conductivity of the product is about $2 \times 10^{-6}$ mho per centimeter. It is significant that this water is tightly bound and does not freeze out at low temperatures.

The term anhydrous battery as used herein and in the appended claims refers to a battery which contains no free water except for water which is chemically bound or used as a bridging compound in the polymeric electrolyte.

Methyl amine is an example of a compound which both reacts chemically with the reactive groups on the polymer and can also furnish hydrogen atoms capable of entering into a hydrogen bond. The reaction product of polyacrylic acid and methyl amine, which contains the structure —$CONHCH_3$ attached to the backbone, is a polymer which is highly conductive per se. The product obtained by reacting methyl amine with polyacrylic acid shows a conductivity of $3.3 \times 10^{-5}$ mho per centimeter as compared with $1.8 \times 10^{-6}$ mho per centimeter of a hydrated polyacrylamide.

The product obtained by reacting ethylene diamine with polyacrylic acid shows a further gain in conductive properties to a conductivity of $1.1 \times 10^{-4}$ mho per centimeter, while the product obtained by reacting urea with polyacrylic acid shows a conductivity of $5.6 \times 10^{-4}$ mho per centimeter.

It appears that the improvement in conductivity comes about through increased resonance stabilization in the pendant groups, resulting from a greater number of resonance structures both from $C=O$ and $NH_2$ groups which are associated with the ureapolyacrylic acid product

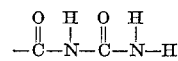

as opposed to that associated with the ethylene diamine product.

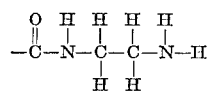

In general, the number of resonance structures increases with the number of double bonds in the radical and, to some extent, with the number of oxygen and nitrogen atoms present, particularly when they are doubly bonded or are adjacent to the double bonds. The side chain groups attached to the polymer backbone should have at least one resonance group other than a carbon-carbon double bond present if the polymers are to be suitably conductive. This resonance group can come from the original reactive group on the polymer side chain, as in the case of polyacrylic acid, or it can come from the compound reacted with the original functional group on the polymer. Obviously, in order to be ionically conductive through the hydrogen bonding technique, it is necessary for the side chains on the polymeric backbone to be spaced along the backbone sufficiently close to permit hydrogen bonding between adjacent chains or to be formed in a manner which will permit the insertion between adjacent chains of a molecule which will, in effect, "bridge" the side chains to draw adjacent side chains into closer proximity thereby improving the ability of the materials to conduct ionically.

Though the conductive materials are suitable for use in the absence of any swelling agents and in the absence of added inorganic and organic electrolytes, the addition of "bridging" compounds can greatly improve the efficiency of the ionic conductivity. The simplest of such compounds is water and, as previously described, when water is added to the conductors, it enters into combination, probably through hydrogen bonding, and produces a marked improvement in the conductive properties of the polymer without the addition of any organic or inorganic electrolytes. Various other compounds capable of forming hydrogen bonds can be used in place of water. Such compounds include ethylene diamine, acetamide, formamide, hydrochloric acid, boron trifluoride, and so forth.

In addition to compounds capable of entering into hydrogen bonds, improved conductivity is also obtained, in the embodiment of the invention wherein an amino nitrogen is present in the polymer structure, by quaternizing the nitrogen atom.

Quaternization, as used herein, refers to the formation of an ammonium structure by reacting an amino structure with a salt. For example, a carbamyl radical can be quaternized with methylchloride according to the reaction

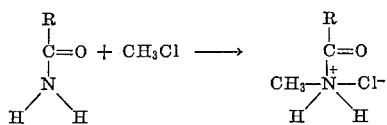

This type of reaction is particularly useful where the reaction conditions in the preparation of the polyelectrolyte tend to produce undesirable cross-linking in the side chains of the polymer. For example, when compounds such as diamines or diamino carbamides are reacted at temperatures in excess of 60° C. with polyacrylic acid, these additives tend to form linear polymers with the elimination of ammonia. Such reactions lead to cross-linked polymer chains with the formation of closed ring groups which reduce the number of possible hydrogen bonding sites and thereby reduce the conductivity of the resulting polymer. In order to control these reactions and prevent decreased polymer conductivity, one of the amino nitrogens is simply quaternized.

In general, either organic or inorganic salts can be used to improve conductivity. For example, ethylene dibromide is a useful quaternizing agent, as is ethyl acetate.

As will be obvious to those skilled in the art, the choice of the proper quaternizing salt will depend greatly upon the particular battery system which is used. For example, when used with a zinc anode, the quaternized salt must have no ion exchange properties with zinc ions to prevent forming the zinc insoluble complex. Ideally, the cation used should be higher in the electromotive force series than the anode metal, e.g., zinc, and should have a more negative free energy of formation than the free energy of formation of the zinc complex. Of those cations higher than zinc in the electromotive force series, manganese is the most preferred since its electromotive force is substantially higher than that of zinc, 1.10 and 0.76 volts respectively, and the free energy of formation of its hydroxide is substantially more negative than that for zinc, $\Delta F°$ —165 and —145 kilogram calories per mole respectively.

The preferred anions include sulfate, phosphate, chloride, bromide, iodide, nitrate, acetate, borate and fluoride. Of these, sulfate and phosphate are most preferred.

The alkali metal, alkaline earth metal, alkyl and alkylene cations are particularly versatile in conjunction with the anions described above as quaternizing salts.

When the anode is aluminum, magnesium bromide is the preferred quaternizing salt. When the anode is magnesium, lithium bromide is preferred.

It has been found that an adjustment of pH will allow greater versatility in the selection of the best quaternizing salt. For example, lithium bromide may best be used with a zinc anode at a pH of 7 while it is most effective with an aluminum anode at a pH of 9.5.

In general, the synthetic ionically conductive materials of this invention have specific ionic conductivities greater than $10^{-9}$ mho per centimeter. Those having specific conductivities greater than $10^{-6}$ mho per centimeter are more widely useful for carrying electrical currents, while those with specific conductivities of greater than $10^{-3}$ mho per centimeter are especially preferred in a number of applications.

The ionically conductive polymers of the present invention are particularly well suited to the production of batteries since the batteries can be made truly dry with all conductive materials used being anhydrous or substantially anhydrous. Additionally, the conductive materials provided by the present invention are relatively unreactive with the commonly used depolarizers and anode metals, show good thermal stability and shelf life, and readily transport cations.

In general, batteries can be formed simply by choosing an anode and cathode at different potentials and by printing the ionicaly conductive polymers onto the appropriate electrode by any of the several known techniques. The polymers are particularly adaptable to the method of silk screening since the polymers are readily dispersed in water to form a paste suitable for printing. The printed surfaces can then be dried and pressed together to form a unit cell.

It will be apparent to those skilled in the art that various battery construction techniques can be employed to yield a battery having the desired characteristics. In this connection, since the preferred battery construction will be very thin, the battery may be rolled into a jelly-roll construction or several cells may be stacked to form a pile type battery.

The following examples are merely illustrative of the present invention and are not intended to be limitative thereof.

EXAMPLE 1

To a closed glass vessel were added 15 grams of urea and 100 grams of a 20 percent solution of polyacrylic acid. The mixture was allowed to react at 60° C. for 24 hours. At the end of this time 15 grams of acetamide were added and the temperature was raised to 70° C. and held for 72 hours. A film having a thickness of 0.005 inch was cast from the resulting compound and was found to have a conductivity of $2 \times 10^{-3}$ mho per centimeter

EXAMPLE 2

In an open vessel equipped with means for sweeping away exhaust gases with carbon dioxide were reacted 60 grams of urea with 232.6 grams of a 20 percent solution of polyacrylic acid. The mixture was heated to 160° C. with stirring until the urea melted and became intimately mixed with the polyacrylic acid. The temperature was then raised to 250° C. and held for 8 days. The pH of an aqueous solution of the final polymer was 5.5 to 6 indicating complete neutralization of the acid groups on the polyacrylic acid and complete removal of the ammonia liberated during the reaction. This material, when cast as a dry film 0.005 inch thick had a conductivity of $0.1 \times 10^{-3}$ mho per centimeter.

EXAMPLE 3

The conductivity of the acrylyl urea polymer described in Example 2 can be substantially increased by the addition of additives which can be hydrogen bonded onto the side chain groups to produce greater conductivity in the polymer.

One mole of the acrylyl urea of Example 2 was dissolved in water. Two moles each of urea and acetamide were reacted in succession with the acrylyl urea for 24 and 48 hours respectively. The conductivity of the resulting compound, cast as a 0.005 inch thick film was $100 \times 10^{-3}$ mho per centimeter.

Increases in conductivity were also observed when the acrylyl urea was reacted with malonamide and ethylene diamine.

EXAMPLE 4

To a triple side-arm flask equipped with a reflux condenser and stirrer were added 100 grams of polyacrylic acid in the form of a 30 percent by weight aqueous solution. To this were added 160 grams of glyoxal in the form of a 30 percent by weight solution and the mixture was heated for 72 hours at 70° C. under reflux conditions with stirring. In order to eliminate any free acid formed, 20 cubic centimeters of propylene oxide were added. An infrared spectrum indicated the completeness of the reaction between the glyoxal and the polyacrylic acid. No change in the absorption associated with the carbonyl group was observed while the absorption associated with the hydroxyl groups was noticeably changed. Conductivities of the product were of the order of $10^{-6}$ mho per centimeter at 21° C.

EXAMPLE 5

To at riple arm reaction flask equipped with heating mantle and reflux condenser were added 100 grams of a 30 percent aqueous solution of polyacrylic acid and 15 grams of hydrazine. The addition of hydrazine was accompanied by the evolution of heat, indicating reaction. After maintaining the reaction temperature at 70° C. for 24 hours to drive off excess hydrazine, 28.8 grams of bromine and 3.7 grams of red phosphorus were added to the mixture. The phosphorus was added to remove free hydrogen ions. In order to accomplish this, the mixture was first cooled to −20° C. and the red phosphorus was added. While maintaining the temperature at −20° C., the bromine was slowly added with stirring and the mixture was held at that temperature for 24 hours. At the end of that time the temperature was raised to about 35° C. and held at that temperature for a period of 24 hours to eliminate free bromine. The bromination step described is not essential to the conductivity of the product but is desirable for reducing the corrosive effects arising when such a preparation is applied to a metal. The specific conductivity of such a preparation is of the order of $10^{-3}$ mho per centimeter at 21° C.

EXAMPLE 6

Ethylene diamine was reacted with polyacrylic acid in generally the same manner set forth in Example 5 except for the omission of bromine and phosphorus. The conductivity of such a preparation was of the order of $10^{-5}$ mho per centimeter.

EXAMPLE 7

In a reaction vessel as described in Example 5, 15 gram of sodium azide and 13 grams of ammonium chloride were added to 100 grams of polyacrylic acid as a 30 percent aqueous solution. The sodium azide and ammonium chloride provide ammonium azide which in turn reacts with the polyacrylic acid. After the addition, the mixture was kept at 70° C. for 24 hours and the resulting ionically conductive product had a conductivity of $1 \times 10^{-5}$ mho per centimeter.

EXAMPLE 8

In the reaction flask described in Example 5, were placed 170 grams of sodium carboxy methyl cellulose in the form of a 20 percent aqueous dispersion. To this were added 48 grams of ethylene diamine and the mixture was refluxed for 48 hours at 70° C. At the end of this time 82 cubic centimeters of concentrated hydrochloric acid were added to form sodium chloride with the sodium ion on the carboxy methyl cellulose and to permit the completion of the reaction between the ethylene diamine and the reactive groups on the cellulose molecule. The original conductivity of the sodium carboxy methyl cellulose was approximately $1 \times 10^{-9}$ mho per centimeter whereas the conductivity of the reaction product was $5.6 \times 10^{-4}$ mho per centimeter.

EXAMPLE 9

To a triple arm reaction flask were added 50 grams of the glass form (acidic) of hexametaphosphate as a 20 percent aqueous dispersion and 16 grams of ethylene diamine. The mixture was heated at a temperature of 70° C. for 24 hours. The conductivity of the hexametaphosphate starting material was $1 \times 10^{-8}$ mho per centimeter whereas the reaction product had a conductivity of $3 \times 10^{-4}$ mho per centimeter.

EXAMPLE 10

To a triple arm reaction flask were added 44 grams of polyvinyl alcohol and 1,930 grams of a 30 percent glyoxal solution. The mixture was heated to a temperature of 70° C. for 48 hours and the conductivity of the resulting product was $1.0 \times 10^{-7}$ mho per centimeter at 21° C.

EXAMPLE 11

Seventy-two grams of polyacrylamide dissolved as a 10 percent aqueous solution was reacted with 60 grams of urea at 70° C. for 24 hours. Subsequently, 59 grams of acetamide was added and the reaction was continued at 70° C. for an additional 48 hours. The completed structure is stable thermally up to 180° C. and displays no hydrolysis in water. A resistance in the order of 40 ohms per square inch was observed for the solid product.

EXAMPLE 12

To a triple arm flask equipped with a stirrer and a condenser were added 100 grams of an aqueous solution of polyacrylic acid (e.g., 30 percent solids). To this were added 29.3 grams of urea. The temperature of the flask and contents was raised to 70° C. and held at that temperature for 72 hours. At the end of the 72-hour period 36 grams of acetamide were added. The temperature was maintained at 70° C. for 24 hours. At the end of the 72-hour period and again at the end of the 24-hour period, infrared spectra were taken to confirm the completion of the reactions between the amide groups and the carboxylic groups on the polymer, by following the change of absorption in the infrared regions normally assigned to amide groups. At the end of the 24-hour period, 11 grams of ethyl bromide were added. The temperature of the mixture was brought to 38° C. and kept under reflux conditions with increased heating for 24 hours. At the end of this time the temperature was at 70° C. At the end of this period a sample of the product was cast on a non-conductive plate and the conductivity of the film was then measured at various temperatures. The conductivity of this preparation was of the order of $10^{-5}$ mho cm.$^{-1}$ at 21° C. The infrared spectra indicate that an amide has been formed. This preparation is particularly useful in battery formulations and is relatively non-corrosive to zinc metal both in the presence and absence of water. Additionally, the films cast from this preparation are water clear and transparent to light.

EXAMPLE 13

In a reaction vessel, 600 grams of a 10 percent aqueous solution of polyacrylamide were reacted with 60 grams of urea, 59 grams of acetamide and 10 grams of ethylene dibromide for 72 hours at 70° C. The resulting product had a conductivity of $4.2 \times 10^{-4}$ mho cm.$^{-1}$.

EXAMPLE 14

To 10 grams of a 15 percent solids polyelectrolyte solution, consisting of the reaction product of 0.85 molar urea and 0.85 molar acetamide with a 40,000 molecular weight polyacrylamide, 1.5 grams of manganous sulfate was added and reacted for 24 hours to quaternize the amino groups as manganese ammonium sulfate. The temperature was raised to 70° C. and the reaction completed in three to four hours. A portion of the resulting solution was reacted with manganese metal suspended in a teabag at 70° C. for 16 hours.

Zinc metal samples immersed in the final solution showed remarkably low corrosion, as was also the case with the manganeous sulfate addition product.

EXAMPLE 15

To 106 grams of polyvinyl pyridine, 109 grams of ethyl bromide was added slowly and warmed to 50° C. and held for 48 hours. The ethyl bromide quaternized with the nitrogen in the pyridine and the nonquaternized ethyl bromide was removed by a stream of carbon dioxide.

The polymer was dispersed as a 30 percent solids solution in water. A resistance between 40 and 250 ohms per square inch was observed.

While this invention has been described with reference to many specific details thereof, it is not intended that these details shall act to restrict this invention.

What is claimed is:

1. In an anhydrous battery a polymeric electrolyte comprising regularly disposed radicals attached to the polymeric chain, said radicals containing at least one resonance group other than a carbon-carbon double bond, at least one atom forming a hydrogen bond with a hydrogen atom, and at least one hydrogen atom entering into a hydrogen bond, said radicals being of such length and geometrical configuration with relation to their disposition on the polymeric chain permitting each radical to form at least one hydrogen bond with an adjacent radical.

2. In the battery of claim 1 wherein the polymer is the reaction product of the polyacrylic acid and an amine.

3. In the battery of claim 2 wherein the amine is selected from the group consisting of monoamino, diamino and triamino compounds having at least one primary amino group.

4. In the battery of claim 1 wherein the polymer is the reaction product of polyacrylic acid and urea.

5. In the battery of claim 1 wherein the polymer is the reaction product of polyacrylic acid and ethylene diamine.

6. In the battery of claim 1 wherein the polymer is the reaction product of polyacrylic acid, urea and acetamide.

7. In the battery of claim 1 wherein the polymer is the reaction product of polyacrylic acid, urea and water.

8. In the battery of claim 1 wherein the polymer is the reaction product of polyacrylamide and an amine.

9. In the battery of claim 8 wherein the amine is selected from the group consisting of monoamino, diamino and triamino compounds having at least one primary amino group.

10. In the battery of claim 1 wherein the polymer is the reaction product of polyacrylamide and urea.

11. In the battery of claim 1 wherein the polymer is the reaction product of polyacrylamide, urea, and acetamide.

12. In the battery of claim 11 wherein the amino groups of the polymer are quaternized with manganous sulfate.

13. In the battery of claim 1 wherein the radicals attached to the polymeric chain contain quaternized amino groups.

14. An anhydrous battery comprising an anode and cathode at different potentials and an ionically conductive polymer electrolyte having regularly disposed radicals attached to the polymeric chain, said radicals containing at least one resonance group other than a carbon-carbon double bond, at least one atom forming a hydrogen bond with a hydrogen atom, and at least one hydrogen atom entering into a hydrogen bond, said radicals being of such length and geometrical configuration with relation to their disposition on the polymeric chain permitting each radical to form at least one hydrogen bond with an adjacent radical.

References Cited

UNITED STATES PATENTS

| 3,257,239 | 6/1966 | Schultz, Jr., et al. | 136—85 |
| 3,257,242 | 6/1966 | Euler et al. | 136—86 |

ALLEN B. CURTIS, Primary Examiner

A. SKAPARS, Assistant Examiner